US 8,000,389 B2

(12) United States Patent
Ducloux et al.

(10) Patent No.: US 8,000,389 B2
(45) Date of Patent: Aug. 16, 2011

(54) METHOD AND DEVICE FOR CODING A VIDEO PICTURE IN INTER OR INTRA MODE

(75) Inventors: Xavier Ducloux, Rennes (FR); Yannick Olivier, Thorigne Fouillard (FR); Anne Lorette, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 1523 days.

(21) Appl. No.: 11/345,108

(22) Filed: Jan. 31, 2006

(65) Prior Publication Data
US 2006/0176956 A1 Aug. 10, 2006

(30) Foreign Application Priority Data

Feb. 10, 2005 (FR) ...................................... 05 50396

(51) Int. Cl.
H04B 1/66 (2006.01)
H04N 7/12 (2006.01)
H04N 11/02 (2006.01)
H04N 11/04 (2006.01)

(52) U.S. Cl. .................... 375/240.13; 382/234; 382/235; 382/236; 382/239

(58) Field of Classification Search .................. 382/323, 382/326, 328, 232, 235, 236, 238, 239, 251–253; 375/240–240.29, 241
See application file for complete search history.

(56) References Cited

U.S. PATENT DOCUMENTS

| 2002/0021757 A1* | 2/2002 | Francois et al. | 375/240.16 |
| 2005/0069211 A1* | 3/2005 | Lee et al. | 382/239 |
| 2006/0062301 A1* | 3/2006 | Sung | 375/240.13 |

OTHER PUBLICATIONS

T. Wiegand (Editor): Text of Final Committee DRaft of Joint Video Specification (ITU-T Rec. H.264/ISO/IEC 14496-10 AVC) Jul. 2002 pp. 67-72, XP002319332.
FR 2 851 111 (Nextream France) Aug. 13, 2004 *abrege; revendications; figures.
Search report Sep. 2, 2005.

* cited by examiner

*Primary Examiner* — Dac V Ha
*Assistant Examiner* — James M Perez
(74) *Attorney, Agent, or Firm* — Robert D. Shedd; Jeffrey M. Navon

(57) ABSTRACT

The method is characterized in that the step for selecting a coding mode from the inter modes and from the intra modes is broken down into two sequential steps, a step for preselecting the intra coding mode for preselecting an intra mode for the current macroblock from the intra coding modes, and a coding decision step, part of the effective coding of the current macroblock for selecting the mode of coding the current macroblock from the inter modes and the preselected intra mode and in that the preselection step for the current macroblock is carried out during the coding decision step for a preceding macroblock.

9 Claims, 3 Drawing Sheets

METHOD AND DEVICE FOR CODING A VIDEO PICTURE IN INTER OR INTRA MODE

This application claims the benefit, under 35 U.S.C. §119 of French Patent Application 0550396 filed Feb. 10, 2005.

FIELD OF THE INVENTION

The invention relates to a method and a device for coding a video picture of a sequence of pictures using picture block intra or inter coding modes.

The field is that of video compression more particularly using inter and intra coding algorithms based respectively on motion compensation between pictures, spatial compensation and on the block transforms. The context covered is the MPEG-4 AVC standard also called MPEG-4 part 10 or H.264.

BACKGROUND OF THE INVENTION

The MPEG-4 AVC video coding standard introduces an intra coding that is much more sophisticated than the preceding standards, because it involves a spatial compensation: it is not the source macroblock that is coded, but the difference between this source macroblock and the pixels originating from the adjacent macroblocks that are already coded.

Intra differential coding as luminance may be carried out on a single block 16×16 in size or on 16 independent blocks 4×4 in size. The number of possible predictions is extremely rich, since nine modes are defined for the 4×4 blocks and four modes are defined for the 16×16 blocks.

FIG. 1 represents schematically the various intra coding modes as luminance for 4×4 blocks. FIG. 2 represents the different intra coding modes as luminance for 16×16 blocks.

Document ITU-T Rec. H.264 (2002 E), also bearing the reference ISO/IEC FCD 14496-10, in chapter 8.5 entitled "intra prediction", describes these different modes of coding. The figure uses the English terms of the standard so that it is easier to refer to. It should be noted that the pure intra mode does not exist; all the intra modes of the standard are differential modes. Intra coding as chrominance is carried out on a single block 8×8 in size, with a prediction chosen from the four possibilities defined for the 16×16 intra mode.

The intra coding decision is therefore of a considerably greater complexity than in the preceding standards. In addition to the computing complexity, the implementation of intra coding poses a problem of causality, since the adjacent pixels used in the predictions are reconstructed pixels, that is to say previously coded, in inter or intra, then decoded. The benchmark coding model of the standard, which is a generic model, describes a general syntax which does not take into account the constraints of operating in real time. The computing complexity and the causality link of intra coding are not the subject of this model.

When real time applications are intended, for example in standard television format, problems of processing time appear, due to the large number of coding modes to be tested. The coding of the macroblocks of the picture is carried out according to a television scanning, the test of the intra modes of the current macroblock can be carried out only after the preceding macroblock has been processed. The problem appears during the hardware implementation, the tests being carried out sequentially.

SUMMARY OF THE INVENTION

One of the objects of the invention is to alleviate the aforementioned disadvantages. The subject of the invention is a method of coding a video picture in inter or intra mode comprising:

a step of converting the picture into picture macroblocks,
a step for selecting, for a current macroblock, according to a cost and/or a quality factor criterion, at least one coding mode from the inter modes depending on a division of the macroblock into blocks and using a motion compensation of these blocks in one or more previously coded pictures and from intra modes depending on a division of the macroblock into blocks using the spatial compensation of these blocks in the picture, compensations used for the computation of predicted values and corresponding residuals to be coded, an inter or intra mode coding of a macroblock corresponding to the combination of the inter or intra modes of coding the blocks constituting the macroblock, characterized in that
the selection step is broken down into two sequential steps, a step for preselecting the intra coding mode for preselecting an intra mode for the current macroblock from the intra coding modes, and a coding decision step, part of the effective coding of the current macroblock, for selecting the mode of coding the current macroblock from the inter modes and the preselected intra mode
and in that the preselection step for the current macroblock is carried out during the coding decision step for a preceding macroblock.

According to a particular embodiment, the preceding macroblock belongs to a preceding picture and the current macroblock belongs to a current picture, the current picture being stored during the effective coding of the macroblocks of the preceding picture.

According to a particular embodiment, the preceding macroblock belongs to a preceding row of macroblocks of the current picture and the current macroblock belongs to a current row of macroblocks, the current row of macroblocks being stored during the effective coding of the macroblocks of a preceding row.

According to a particular embodiment, the preselection step comprises one or more divisions of the picture's macroblocks into blocks of different sizes on which the spatial compensations are performed for the computation of the residuals, the cost of coding the macroblock being the sum of the costs of coding the blocks constituting it.

According to a particular embodiment, intra modes are relative to the choice of the pixels based on whose values the predicted values are computed.

According to a particular embodiment, the intra modes of the blocks are at least the 16×16 and 4×4 intra modes defined in the H.264 standard.

According to a particular embodiment, the cost and/or the quality factor of an intra mode for a block of a macroblock are obtained by carrying out the coding of the block according to the effective method of coding the blocks when this intra coding mode is selected for the block of the macroblock.

According to a particular embodiment, the cost and/or the quality factor of an intra mode for a block of a macroblock are obtained by carrying out an estimate based, respectively, on the syntax of the stream relative to the data coded according to the intra mode and on the difference between the source block to be coded and the block predicted according to the intra mode.

The invention also relates to a device for coding a video picture in inter mode with motion compensation or in intra mode with spatial compensation, from inter coding modes and intra coding modes, according to a cost and/or distortion criterion, characterized in that it comprises a first pass intra coding circuit carrying out an intra coding of a picture or part of a picture to select a coding mode from a set of intra coding modes, a memory for storing the picture or part of a picture during the first pass, a coding decision circuit for the stored picture or part of a picture transmitted by the memory, between coding modes of the inter type and the selected coding mode of intra type transmitted by the first pass intra coding circuit.

The proposed solution consists of taking the intra coding decision in a context of intra coding of all of the picture and of reusing this intra decision in the final decision process of coding the P and B pictures. This final process may then be limited to selecting the best prediction mode from N possible inter prediction modes and one intra prediction mode, the one selected during the first coding pass.

Thanks to the implementation of a first intra coding pass of the picture, it is no longer necessary to wait for the end of processing a macroblock to compute the costs of coding the following macroblock in the various intra modes.

BRIEF DESCRIPTION OF THE DRAWINGS

Other particular features and advantages of the invention will appear clearly in the following description given as a non-limiting example and made with respect to the appended figures which represent.

DETAILED DESCRIPTION OF PREFERRED EMBODIMENTS

Figure 1:
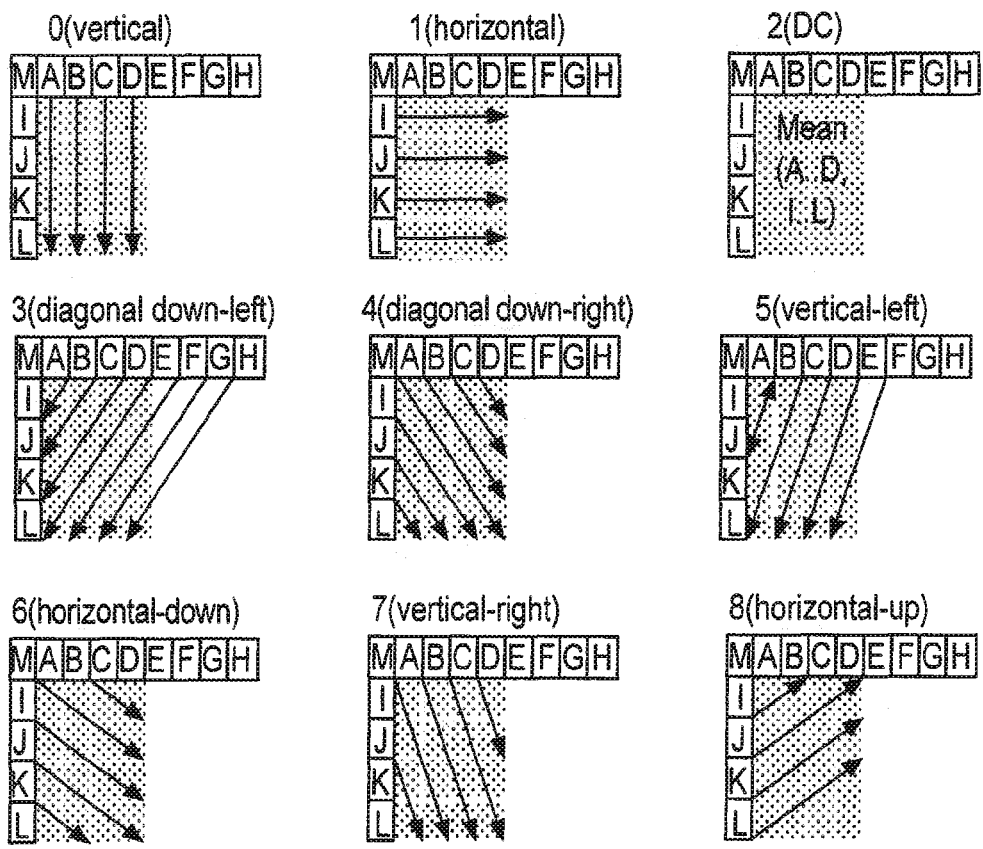
FIG. 1, 4×4 intra coding modes, according to the prior art.
Figure 2:
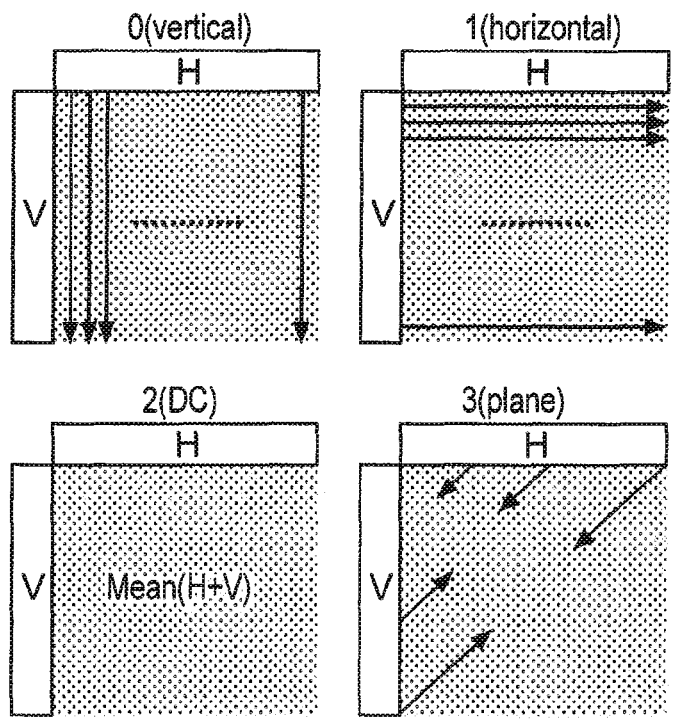
FIG. 2, 16×16 intra coding modes, according to the prior art.
Figure 3:
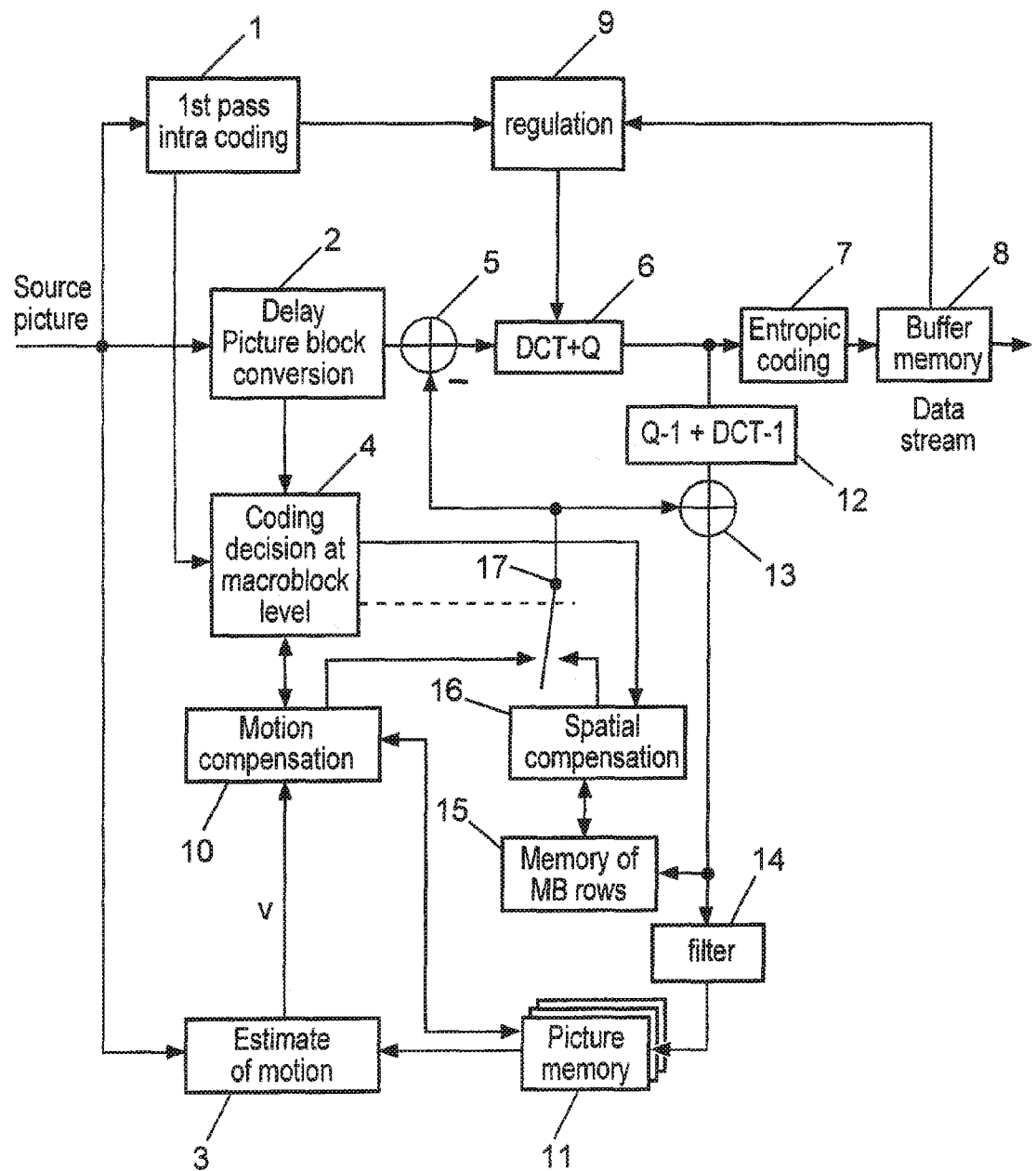
FIG. 3, a diagram of the coding circuit.

FIG. 3 describes a coding device for the implementation of the method according to the invention.

In the example described, the first intra coding pass is made picture by picture, generating a delay of a picture period. The selected intra modes are associated with each of the macroblocks of the picture. Similarly, the motion estimate is made for a complete picture, the generated motion vectors field associating motion vectors with each macroblock of the picture.

A picture sequence is processed by a preprocessing circuit, of the sequence, not shown in the figure, which performs amongst other things the structuring into groups of pictures or GOP, the choice of each picture type, I, P or B, that is to say intra, anticipated or deferred predictional, or bidirectional, and the reordering of the pictures. Each source picture of the video sequence, after reordering, is transmitted to the input of the device represented in FIG. 3, an input connected to a first pass intra coding circuit, reference number 1, to 10 a delay and conversion-to-picture-blocks circuit, reference number 2, and to a motion estimate circuit, reference number 3.

The first pass intra coding circuit 1 performs a coding operation in intra mode of blocks of the video picture received, whether it be of type I, P or B. The various 16×16 intra and 4×4 intra coding modes as previously described are thus tested for each of the macroblocks, the circuit selecting a 16×16 intra mode for the macroblock or a 4×4 intra mode for each of the blocks of the macroblock, based on a cost/quality factor function which takes into consideration the cost of coding and the distortion of the coded macroblock.

The motion estimate circuit 3 receives the source picture on a first input and a reconstructed picture from a reconstructed pictures memory 11 on a second input. It associates with each of the picture's macroblocks motion vectors corresponding to a computation for correlating the blocks of the macroblock of the source picture with blocks of a reconstructed picture. This may be the preceding or next picture or a combination of the two depending on the type of picture to be coded. The associated motion vectors correspond to the various divisions of the macroblock into blocks; these are for example the vectors originating from the correlation of 16×16, 16×8, 8×8, etc. size blocks constituting the macroblock.

The information relating to the intra coding mode selected during the first pass intra coding is transmitted to a coding decision circuit at the macroblock level, reference number 4. The function of this circuit is to make the choice, for the macroblocks of the different pictures of type P or B, between the selected intra coding mode and an inter-type coding mode.

The delay and conversion-into-picture-blocks circuit, reference number 2, stores each picture during the first pass intra coding. The picture thus delayed is also divided into macroblocks and blocks. The macroblocks are transmitted to a coding decision circuit at the macroblock level 4. Equally, and in a conventional manner, each 4×4 source block of the macroblock to be coded is transmitted to a subtractor 5 which receives, on a second input, the corresponding predicted block. The 4×4 luminance block at the output of the subtractor, called the prediction error block, is transmitted to an integer and quantization discrete cosine transform or DCT, reference number 6, to supply blocks of quantized coefficients or blocks of residuals, then to an entropic coding circuit 7 which performs an entropic coding of the quantized and serialized values and to a buffer memory 8 at the output of the device. The fill rate of the buffer memory 8 is used by a regulation circuit 9 which acts on the quantization step of the quantizer 6 to regulate the speed of the data stream of the coder.

When the inter mode is selected by the coding decision circuit at the macroblock level 4, the latter positions a switch 17 so as to connect the output of a motion compensation circuit 16 to the subtractor 5. The motion compensation circuit, based on the inter coding mode transmitted by the coding decision circuit at the macroblock level and on the motion vectors transmitted by the motion estimate circuit for the macroblock, fetches from the memory of reconstructed pictures 11, the reconstructed picture block or blocks corresponding to this or these motion vectors to compute the predicted 4×4 block to be transmitted to the second input of the subtractor, a predicted picture block corresponding to the 4×4 block of the processed macroblock present on the first input of the subtractor.

When the intra mode is selected by the coding decision circuit at the macroblock level 4, the latter positions the switch 17 so as to connect the output of a spatial compensation circuit 16 to the subtractor 5. A predicted picture block corresponding to the 4×4 block of the processed macroblock present on the first input of the subtractor is then sent to the second input of the subtractor. The spatial compensation circuit 16 fetches from a macroblock row memory 15 the luminance values of the pixels corresponding to the predicted block defined by the selected intra coding mode, the mode transmitted by the coding decision circuit at the macroblock level 4.

The block of quantized coefficients at the output of the discrete and quantization cosine transform circuit 6 is also transmitted to an inverse quantization and inverse discrete cosine transform circuit, reference number 12, to supply a luminance block. The predicted block is added to this block by means of an adder 13. The block thus reconstructed is transmitted to a macroblock row memory 15 which stores the last row of macroblocks. It is also transmitted to a filter 14 which attenuates the block effects. The filtered block is stored in the reconstructed picture memory 11.

The first pass intra coding circuit 1 can base the selection of the best intra mode, during this intra coding pass, on different models, for example on a real coding, this is the "a posteriori" model, or a else on an estimate of the cost/distortion doublet, this is the "a priori" model.

In the first case, an intra mode decision module of the first pass intra coding circuit performs a complete coding of each 4×4 block by using the nine possible 4×4 intra modes and the four 16×16 intra modes. For each 4×4 intra mode of each block of the macroblock, a coding cost is computed as is a distortion, a function of the difference between the source block and the reconstructed block. The mode corresponding to the best cost/distortion compromise is chosen for each of the blocks of the macroblock. The coding cost and coding distortion at the global macroblock level corresponding to the combination of the 4×4 intra modes chosen is then compared with the cost and distortion for the 16×16 intra modes. This module therefore consists of a set of blocks whose functions perform the various intra coding operations, amongst other things a subtractor, a DCT computation circuit and a quantizer for supplying residuals, inverse DCT and quantization circuits, an adder for reconstructing the block, a memory, a motion compensation for calculating the predicted block as described later with respect to FIG. 4.

In the second case, the a priori model, the intra mode decision module contents itself with estimating the coding/distortion cost without performing a computation of the reconstructed block, based on the prediction error. Such a solution is proposed in the AVC standard benchmark model. The prediction values are extracted from the source block and not from the reconstructed block. For example, the SATD (Sum of Absolute Transform Difference) function is used. The various 4×4 and 16×16 intra coding modes are used to give, for each of the 4×4 blocks constituting the macroblock, prediction errors by subtracting from the source luminances the predicted luminances corresponding to these modes. A Hadamard transform of the prediction error blocks then provides coefficients or residuals which are summed in absolute value. It is also possible to sum the squares of the prediction errors. The sum obtained is indicative, as a first approximation, of the distortion. The computation of the cost may be limited to that of the syntax, that is to say the headers of the macroblock, without taking account of the coefficients coding cost. This module comprises, amongst other things, a subtractor, and a transform computation circuit.

As for the selection of the intra coding mode in the first intra coding pass, the selection of the best inter/intra coding mode, performed by the coding decision circuit at the macroblock level 4, may be based on a real coding or on an estimate of the cost/distortion pair.

In the first case, real coding, the circuit comprises all the previously described blocks used to compute the inter and intra coding cost and therefore the predicted blocks of the macroblock and the residuals. This involves, amongst other things, a subtractor, a DCT computation circuit, a quantizer, inverse DCT and quantization circuits, an adder to reconstruct the block and macroblock, a motion compensation to calculate the predicted block. With respect more particularly to the intra mode, the computation of the prediction block is in fact necessary, if a precise computation is required, because it is different from the prediction block computed during the first pass for this block and selected intra mode. The first pass intra mode performs a pure intra coding, that is to say that all the macroblocks of the picture are coded in intra mode. The effective coding mode chosen by the coding decision circuit at the macroblock level may be the inter or intra mode and it is therefore completely possible that the prediction values for the computation of the intra mode originate from the macroblocks coded in inter mode and therefore from reconstructed values that are different from those computed during the first pass.

In the second case, estimated values, the cost and the distortion may be estimated respectively on simply the cost of the syntax and on the difference between a source block and the prediction block. However, in a variant allowing a simplified architecture, the estimate of the distortion, for the intra mode, may be performed by using the prediction values of the source block and not of the reconstructed block, by using the cost/distortion information computed by the first pass intra coding circuit for the selected intra mode.

Figure 4:
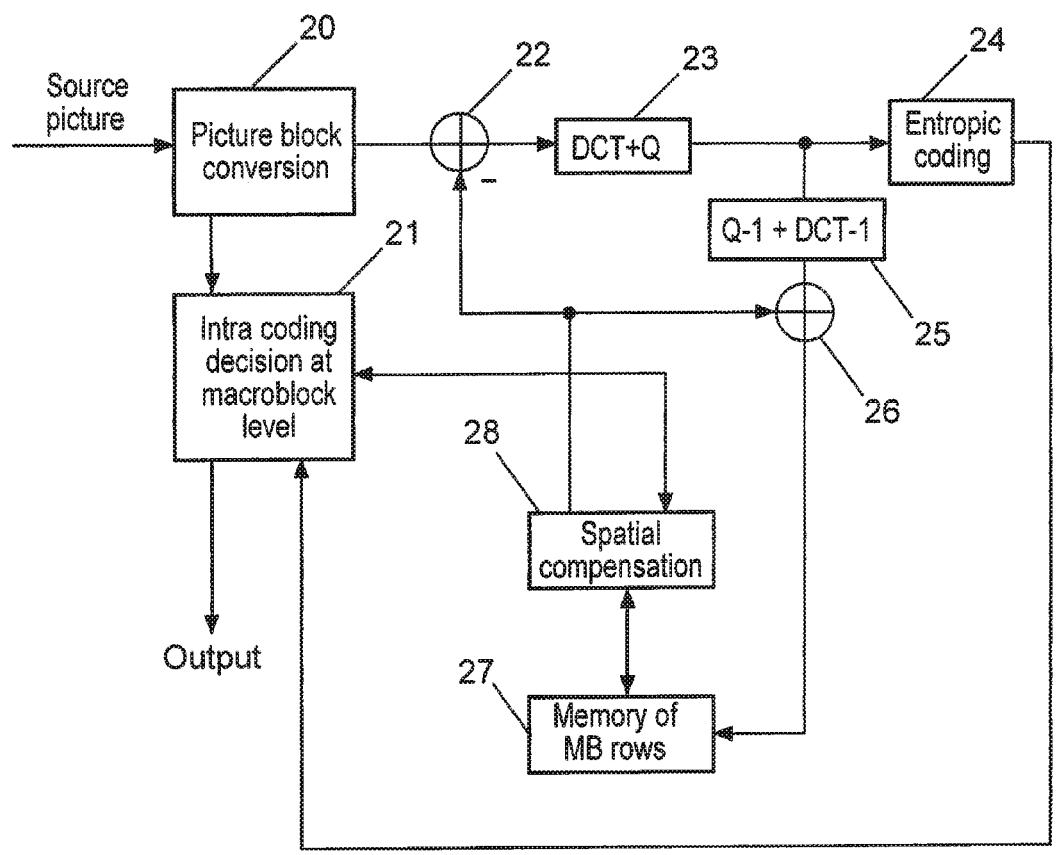
FIG. 4, a diagram of the first pass intra coding circuit.

A first pass intra coding circuit 1 according to the "a posteriori" model will now be described with the aid of FIG. 4.

The input of the circuit is supplied by the source picture. A picture block conversion circuit supplies the 4×4 pixels dimension blocks to the subtractor circuit 22 which supplies the discrete cosine transform and quantization circuit 23. This circuit is connected to the entropic coding circuit 24 and to the inverse quantization and inverse transform circuit 25. A predicted block is transmitted to the second input of the subtractor 22. The inverse quantization and inverse discrete cosine transform circuit 25 performs the inverse operations of the circuit 23. The adder 26 receives the coded then decoded block originating from the circuit 25 on a first input and the predicted block on a second input to supply a reconstructed intra block at its output.

This intra picture block is stored in a macroblock row memory 27. A spatial compensation circuit 28 fetches from the memory 27, according to the intra coding mode to be tested that has been received from an intra coding decision circuit at the macroblock, reference number 21, the prediction values of the block to be tested that are on the first input of the subtractor circuit 22, for the computation of the predicted block presented on the second input of the subtractor 22. The intra coding decision circuit 21 reviews the various intra coding modes at the macroblock level. It receives from the entropic coding circuit the data stream that makes it possible to compute the cost of coding based on the syntax.

The motion estimate described is performed on the complete picture during the 1st pass intra coding. It can just as feasible to perform this motion estimate more conventionally, macroblock by macroblock, during the coding of the macroblock.

Similarly, the first pass intra is performed, according to the previous description, picture by picture. It is just as feasible to perform this first pass, row of macroblocks by row of macroblocks. If the standard used allows the picture to be partitioned into pairs of macroblocks, as described for example in paragraph 6.3 entitled "calculation of the macroblock address" of document ITU-T Rec. H.264 (2002 E), the first pass processing is then performed by two rows of macroblocks. The delay occasioned by this process, called first pass, then corresponds not to a complete picture but to a row or two rows of macroblocks. The delay circuit 2 makes it possible to store the current picture to be coded, the row or rows of macroblocks to be coded during the processing or preanalysis relative to the first pass. The delay therefore corresponds to the duration of a picture, of one or two rows of macroblocks in these examples. It is during the storing of the picture, of the row or of the rows of macroblocks, that the effective coding of the preceding picture is performed, of the row or of the preceding rows, a coding comprising the coding decision step at the macroblock level.

The partitioning of a macroblock into blocks of pictures has been described for blocks of 4×4 pixels dimensions. Any partitioning of the macroblock into blocks of other dimensions, for the definition of intra modes, forms part of the field of the invention, an invention which is of increasing value as the number of possible intra modes of a macroblock, which is at least equal to the number of possible combinations of intra modes of blocks constituting the macroblock, increases. It can of course also be envisaged to consider modes corresponding to divisions of the macroblock into blocks of sizes that differ amongst themselves. The MPEG-4-AVC standard proposes a profile called "high profile" which allows the coding of blocks of 8×8 dimensions in a similar manner to the nine 4×4 intra prediction modes described.

According to the exemplary embodiments, the source picture is partitioned into picture macroblocks, a macroblock being defined by the MPEG standard. This of course involves examples and the invention equally applies to any type of partitioning of the picture into picture blocks, a macroblock then having to be considered more generally, that is to say as a set of blocks, each block being able to be the subject of a particular intra coding mode, the combination of these blocks defining the intra coding mode for the macroblock.

The losses of coding quality due to the use of the method remain measured. The latter makes it possible to parallelize the decision processes and to delete, where appropriate, the constraining causality link that exists between a macroblock and its entourage for the computation of the intra prediction.

The field of the invention is that of coding schemes based on the use of motion compensation and spatial compensation. In particular, it comprises the MPEG-4 AVC standard and the "hardware" architectures allowing the development of products for the real time coding of standard television pictures.

The proposed method does not compromise the integrity of the product stream, since it affects the process of selecting the coding mode but not the coding itself. In particular, if the intra coding mode is finally chosen in the inter/intra decisions process, the macroblock or block will be coded using the adjacent, previously coded and decoded pixels, in order to comply with the standard.

What is claimed is:

1. Method of coding a video picture sequence in inter coding mode or intra coding mode, wherein different intra coding modes and different inter coding modes can be used, said method comprising the steps:
converting a current picture into picture macroblocks;
first pass intra coding the current picture on macroblock level using the original picture data, thereby pre-selecting for each macroblock a specific intra coding mode out of the available intra coding modes, wherein a macroblock can be divided into several blocks to each of which a specific intra coding mode is assigned that uses spatial compensation of the blocks in the current picture;
storing, in a memory, the current picture during the first pass;
second pass coding the current picture on macroblock level transmitted by the memory whereby reconstructed picture data can be used and wherein, according to a cost and/or a quality factor criterion, for a current macroblock at least one coding mode is selected out of said pre-selected intra coding mode and said available inter coding modes depending on a division of the current macroblock into several blocks and using a motion compensation of these blocks in one or more previously coded pictures for the computation of predicted block values and corresponding residuals to be coded,
and wherein said pre-selection of the intra coding mode for the current macroblock is carried out during the second pass coding mode selection for a preceding macroblock.

2. Method according to claim 1, wherein the preceding macroblock belongs to a preceding picture and the current macroblock belongs to a current picture, the current picture being stored during the effective coding of the macroblocks of the preceding picture.

3. Method according to claim 1, wherein the preceding macroblock belongs to a preceding row of macroblocks of the current picture and the current macroblock belongs to a current row of macroblocks, the current row of macroblocks being stored during the effective coding of the macroblocks of a preceding row.

4. Method according to claim 1, wherein the preselection step comprises one or more divisions of the picture's macroblocks into blocks of different sizes on which the spatial compensations are performed for the computation of the residuals, the cost of coding the macroblock being the sum of the costs of coding the blocks constituting it.

5. Method according to claim 1, wherein intra modes are relative to the choice of the pixels based on whose values the predicted values are computed.

6. Method according to claim 1, wherein the intra modes of the blocks are at least the 16×16 and 4×4 intra modes defined in the H.264 standard.

7. Method according to claim 1, wherein the cost and/or the quality factor of an intra mode for a block of a macroblock are obtained by carrying out the coding of the block according to the effective method of coding the blocks when this intra coding mode is selected for the block of the macroblock.

8. Method according to claim 1, wherein the cost and/or the quality factor of an intra mode for a block of a macroblock are obtained by carrying out an estimate based, respectively, on the syntax of the stream relative to the data coded according to the intra mode and on the difference between the source block to be coded and the block predicted according to the intra mode.

9. Device for coding a video picture sequence in inter coding mode or intra coding mode, wherein different intra coding modes and different inter coding modes can be used and a current picture is converted into picture macroblocks, said device comprising:
a first pass intra coding circuit carrying out an intra coding of the current picture on macroblock level using the original picture data, thereby pre-selecting for each macroblock a specific intra coding mode out of the available intra coding modes, wherein a macroblock can be divided into several blocks to each of which a specific intra coding mode is assigned that uses spatial compensation of the blocks in the current picture;
a memory for storing the current picture or part of the current picture during a second pass coding circuit carrying out a coding of the current picture on the macroblock level or part of the current picture transmitted by the memory, whereby reconstructed picture data can be used and wherein, according to a cost and/or a quality factor criterion, for a current macroblock at least one coding mode is selected out of said pre-selected intra coding mode and said available inter coding modes depending on a division of the current macroblock into several blocks and using a motion compensation of these blocks in one or more previously coded pictures for the computation of predicted block values and corresponding residuals to be coded, and wherein said pre-selection of the intra coding mode for the current macroblock is carried out during the second pass coding mode selection for a preceding macroblock.

* * * * *